UNITED STATES PATENT OFFICE.

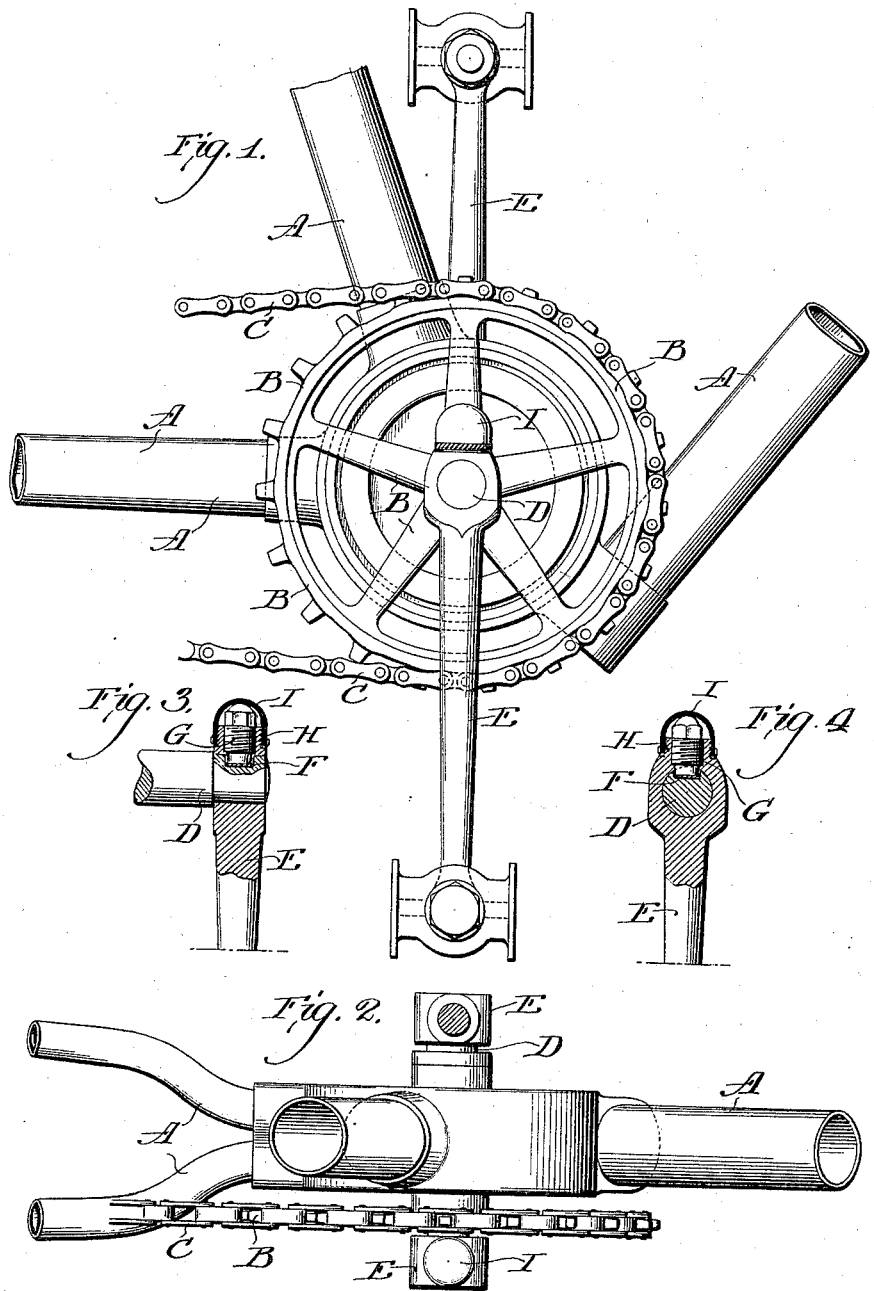

WILLIAM DIEBEL, OF PHILADELPHIA, PENNSYLVANIA.

CRANK FOR BICYCLES.

SPECIFICATION forming part of Letters Patent No. 584,858, dated June 22, 1897.

Application filed January 18, 1896. Serial No. 575,941. (No model.)

*To all whom it may concern:*

Be it known that I, WILLIAM DIEBEL, a citizen of the United States, residing at Philadelphia, in the county of Philadelphia and State of Pennsylvania, have invented certain new and useful Improvements in Cranks for Bicycles; and I do declare the following to be a full, clear, and exact description of the invention, such as will enable others skilled in the art to which it appertains to make and use the same.

My invention relates to bicycles, and has for its object to secure the crank to the crankshaft, so that while readily detachable it will in operation be firmly connected to the shaft and present no angular projections which might catch and tear the clothing of the rider.

To this end the invention consists of a screw-bolt adapted to pass through that part of the crank surrounding the shaft and enter an orifice in the shaft, combined with a semispherical smooth projecting cap and jam-nut which is threaded internally and engaging an external thread on the rearward end of the crank, so placed as to entirely inclose the projecting head of the bolt.

The invention will be more fully understood by reference to the accompanying drawings, in which—

Figure 1 is a side view of the crank-shaft, crank, sprocket-wheel, sprocket-chain, and a small portion of the frame. Fig. 2 is a plan view of Fig. 1. Fig. 3 is a detached end view, partly in section, of the portion of Fig. 1 embodying my invention; and Fig. 4 is a side view similar to Fig. 3.

A represents the frame; B, the sprocket-wheel; C, the sprocket-chain; D, the crank-shaft, and E the crank.

The crank E is enlarged at its pivotal end, which is bored out, so as to slip and fit snugly upon the shaft D. The rear end of this crank is provided with a threaded opening in alinement when the crank is in proper position on the shaft, with a depression in the shaft. To fixedly secure the crank to the shaft, the washer F, which is made of steel much harder than that of the crank-shaft, is dropped into the said depression and the bolt G screwed into the orifice in the crank until the lower end of the bolt enters the depression and impinges against the washer F, which takes the strain and prevents the bolt from damaging the softer steel crank-shaft.

The construction so far described is an imperfect and unsatisfactory mode of securing the crank to the shaft, for the reason that the head of the bolt is unnecessarily left exposed and is liable to catch upon and tear the garments of the rider, and for the further reason that the bolt is liable to work loose. To obviate both these objections, I cut away the extreme rearward end of the crank to form an exterior threaded boss H and provide an internally-threaded semispherical pocketing-cap I, which I screw upon the threaded end of the crank until it abuts against the head of the bolt G. This cap not only presents a perfectly smooth surface, but it performs the additional function of a jam-nut, holding in place the bolt G and preventing the same from working loose.

The device can be readily attached or detached, but cannot be accidentally loosened when in position.

I have found in practice, while reducing my invention to a commercial form, that the best results are obtained where threads of different pitch are employed, one of which is formed upon the crank, as already described, and fully illustrated in the drawings.

Having now fully described my invention, what I claim, and desire to secure by Letters Patent, is—

The combination with a shaft, of a crank bored to fit the same and provided with an exteriorly-threaded boss, and a set-screw opening through said boss at right angles to the shaft-bore, a set-screw fitted to said opening and having its end adapted to engage a recess in the shaft, and a screw-cap fitted to said boss, the interior of said cap being adapted to jam against the head of the seated set-screw before reaching the end of its travel upon the threaded boss, substantially as described.

In testimony whereof I affix my signature in presence of two witnesses.

WM. DIEBEL.

Witnesses:
JOHN M. FARIES,
ROBERT W. LLOYD.